United States Patent
Niikura et al.

(10) Patent No.: US 10,297,006 B2
(45) Date of Patent: May 21, 2019

(54) IMAGE PROCESSING SYSTEM, IMAGE PROCESSING METHOD, AND IMAGE TRANSMITTING APPARATUS

(71) Applicant: Renesas Electronics Corporation, Tokyo (JP)

(72) Inventors: Kentarou Niikura, Tokyo (JP); Kazuhiko Takami, Tokyo (JP); Kazuhiro Sugiyama, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 105 days.

(21) Appl. No.: 15/468,059

(22) Filed: Mar. 23, 2017

(65) Prior Publication Data

US 2017/0301061 A1    Oct. 19, 2017

(30) Foreign Application Priority Data

Apr. 18, 2016   (JP) .................................. 2016-082725

(51) Int. Cl.
    *G06T 3/40*    (2006.01)
(52) U.S. Cl.
    CPC ...................................... *G06T 3/40* (2013.01)
(58) Field of Classification Search
    CPC ........................................................ G06T 3/40
    See application file for complete search history.

(56) References Cited

U.S. PATENT DOCUMENTS

| | | | | |
|---|---|---|---|---|
| 2006/0269157 A1* | 11/2006 | Eruhimov | .............. | H04N 19/98 382/254 |
| 2011/0162037 A1* | 6/2011 | Kasahara | ................ | G06F 21/64 726/1 |
| 2011/0206296 A1* | 8/2011 | Sakaguchi | ............ | G06T 3/4053 382/299 |
| 2011/0243470 A1* | 10/2011 | Noguchi | .............. | H04N 19/176 382/239 |
| 2014/0071169 A1* | 3/2014 | Chang | ................... | G06T 3/4092 345/660 |
| 2015/0244941 A1* | 8/2015 | Nishimori | .......... | H04N 5/23212 348/240.2 |
| 2015/0288851 A1* | 10/2015 | Takashima | ............. | H04N 5/142 382/298 |

(Continued)

FOREIGN PATENT DOCUMENTS

JP        2001-320707 A       11/2001

Primary Examiner — Bobbak Safaipour
(74) Attorney, Agent, or Firm — McGinn I.P. Law Group, PLLC.

(57) ABSTRACT

It is possible to stably reduce an amount of image data. An image processing system includes an image transmitting apparatus and an image receiving apparatus. The image transmitting apparatus includes an image reducing unit that reduces the size of an input image to generate a reduced image, a determining unit that determines, when the reduced image is enlarged to the size of the input image, an enlargement parameter where a difference from the input image becomes minimum and a transmitting unit that transmits the reduced image and the enlargement parameter. The image receiving apparatus includes a receiving unit that receives the reduced image and the enlargement parameter from the image transmitting apparatus and an image restoring unit that enlarges the reduced image using the enlargement parameter to generate a restored image.

20 Claims, 16 Drawing Sheets

(56) References Cited

U.S. PATENT DOCUMENTS

2017/0041620 A1* 2/2017 Du .................... H04N 19/132
2017/0230539 A1* 8/2017 Shimizu ............. G06T 3/4007
2018/0103214 A1* 4/2018 Ise .................... H04N 5/23296

* cited by examiner

IMAGE PROCESSING SYSTEM, IMAGE PROCESSING METHOD, AND IMAGE TRANSMITTING APPARATUS

CROSS-REFERENCE TO RELATED APPLICATIONS

This application is based upon and claims the benefit of priority from Japanese patent application No. 2016-082725, filed on Apr. 18, 2016, the disclosure of which is incorporated herein in its entirety by reference.

BACKGROUND

The present invention relates to an image processing system, an image processing method, and an image transmitting apparatus, and relates to, for example, an image processing system, an image processing method, and an image transmitting apparatus for transmitting and receiving image data.

In recent years, the resolution of network cameras has been increasing and the number of network cameras that are installed has been increasing. Video data captured by a network camera is transmitted to a video reproducing apparatus or the like via a network. Japanese Unexamined Patent Application Publication No. 2001-320707 is known, for example, as a technique regarding an image transmission system.

Japanese Unexamined Patent Application Publication No. 2001-320707 discloses a technique for extracting a difference between successive images that have been taken and transmitting a compressed image obtained by compressing image components of the difference (change area) as a second image data and positional information of the difference.

SUMMARY

According to the technique disclosed in the aforementioned Japanese Unexamined Patent Application Publication No. 2001-320707, a difference between a frame and a subsequent frame on a time axis is used. However, the amount of data may be locally increased. In the worst case, the amount of information may not be reduced compared to the amount of the original information. Accordingly, a transmission/reception apparatus needs to have a configuration that can cope with such a worst case. Therefore, there is a possibility that the technique disclosed in Japanese Unexamined Patent Application Publication No. 2001-320707 may not necessarily lead to the system being efficient.

The other problems of the related art and the novel characteristics of the present invention will be made apparent from the descriptions of the specification and the accompanying drawings.

According to one embodiment, an image processing system transmits a reduced image obtained by reducing the size of an input image and an enlargement parameter where a difference from the input image becomes minimum when the reduced image is enlarged to the size of the input image.

According to the embodiment, it is possible to stably reduce the amount of image data.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
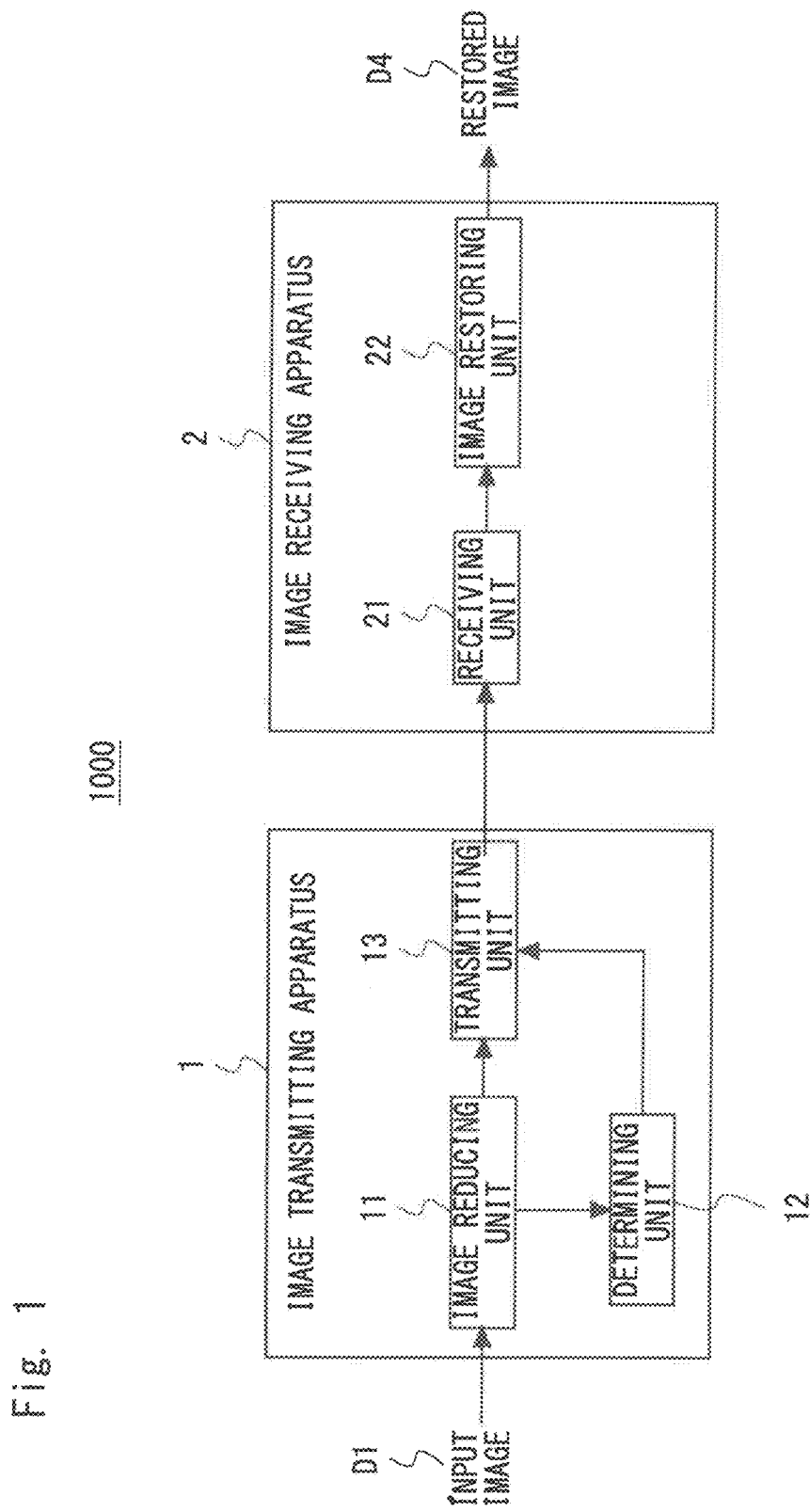
FIG. 1 is a block diagram showing a configuration of an image processing system according to a first embodiment.

Specific embodiments to which the means for solving the problem stated above has been applied will be described below with reference to the accompanying drawings. Throughout the drawings, the same elements are denoted by the same reference numerals, and a duplicate description is omitted as necessary.

In the following embodiments, when necessary, a description will be given by using separate sections or separate embodiments. However, those embodiments are not unrelated with each other, unless otherwise specified. That is, they are related in such a manner that one embodiment is a modified example, an application example, a detailed example, or a supplementary example of a part or the whole of another embodiment. Further, in the following embodiments, when the number of elements or the like (including numbers, values, quantities, ranges, and the like) is mentioned, the number is not limited to that specific number except for cases where the number is explicitly specified or the number is obviously limited to a specific number based on its principle. That is, a larger number or a smaller number than the specific number may also be used.

Further, in the following embodiments, the components (including operation steps and the like) are not necessarily indispensable except for cases where the component is explicitly specified or the component is obviously indispensable based on its principle. Similarly, in the following embodiments, when a shape, a position relation, or the like of a component(s) or the like is mentioned, shapes or the like that are substantially similar to or resemble that shape are also included in that shape except for cases where it is explicitly specified or they are eliminated based on its principle. This is also true for the above-described number or the like (including numbers, values, quantities, ranges, and the like).

First Embodiment

First, the basic configuration of a first embodiment will be described.

FIG. 1 is a block diagram showing a configuration of an image processing system 1000 according to the first embodiment. The image processing system 1000 includes an image transmitting apparatus 1 and an image receiving apparatus 2. An input image D1 is image data included in video data captured by a high-resolution network camera or the like. The image transmitting apparatus 1 and the image receiving apparatus 2 are connected to each other via a network line or the like.

The image transmitting apparatus 1 includes at least an image reducing unit 11, a determining unit 12, and a transmitting unit 13. The image reducing unit 11 reduces the size of the input image D1 to generate a reduced image. To "reduce the size" means to reduce the resolution of the image data or to reduce the number of pixels. Therefore, the reduced image is also the image data and data before compression encoding. Accordingly, to "reduce the size" is not limited to removing pixels of the input image D1 and it is sufficient that the number of pixels of the image be eventually reduced. That is, a plurality of existing pixels may be replaced by one new pixel. Accordingly, processing for "reducing the size" includes, for example, (1) simply removing pixels such as reducing the size of the image by 1/integer, (2) wavelet transformation, (3) bilinear processing (reducing the size by 1/1.5), and (4) bicubic processing. In accordance therewith, the amount of data of the reduced image becomes smaller than the amount of data of the input image D1.

The determining unit 12 determines, when the reduced image is enlarged to the size of the input image D1, an enlargement parameter where the difference from the input image D1 becomes minimum. The transmitting unit 13 transmits the reduced image and the enlargement parameter to the image receiving apparatus 2.

The image receiving apparatus 2 includes a receiving unit 21 and an image restoring unit 22. The receiving unit 21 receives the reduced image and the enlargement parameter from the image transmitting apparatus 1. The receiving unit 21 may store the reduced image and the enlargement parameter that have been received in a storage apparatus (not shown) in such a way that they are associated with each other. The image restoring unit 22 enlarges the reduced image using the enlargement parameter to generate a restored image D4. The image receiving apparatus 2 is able to output the restored image D4 to a monitor (not shown) or the like to display the restored image D4 on the monitor.

Figure 2:
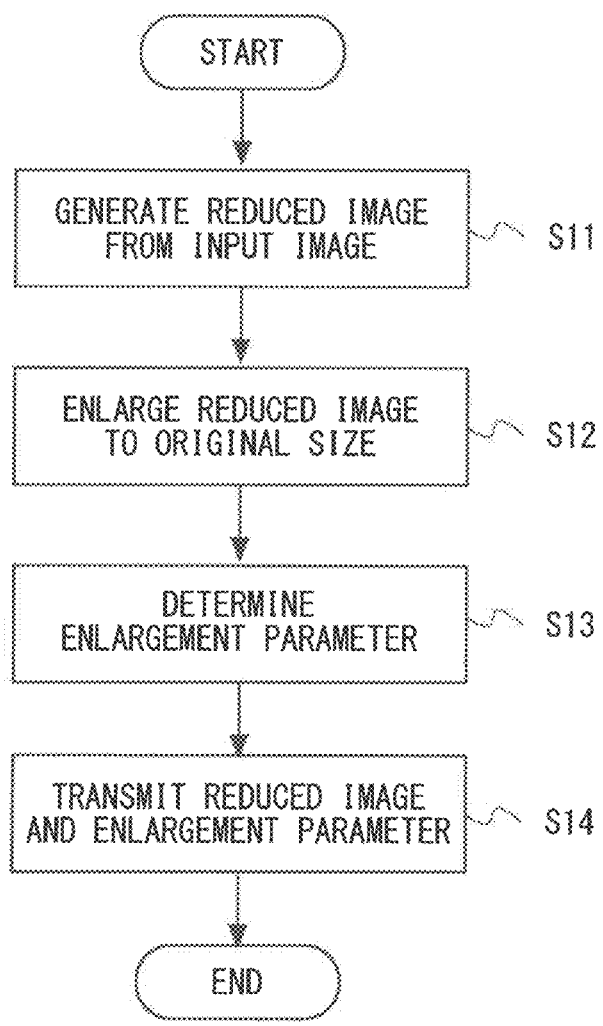
FIG. 2 is a flowchart for describing a flow of image transmitting processing according to the first embodiment.

FIG. 2 is a flowchart for describing a flow of the image transmitting processing according to the first embodiment. First, the image reducing unit 11 of the image transmitting apparatus 1 reduces the size of the input image D1 to generate the reduced image (S11). Next, the image transmitting apparatus 1 enlarges the reduced image to the original size of the input image D1 (S12). The determining unit 12 of the image transmitting apparatus 1 determines, when the reduced image is enlarged to the size of the input image D1, the enlargement parameter where the difference from the input image D1 becomes minimum (S13). Then the transmitting unit 13 of the image transmitting apparatus 1 transmits the reduced image and the enlargement parameter to the image receiving apparatus 2 (S14).

Figure 3:
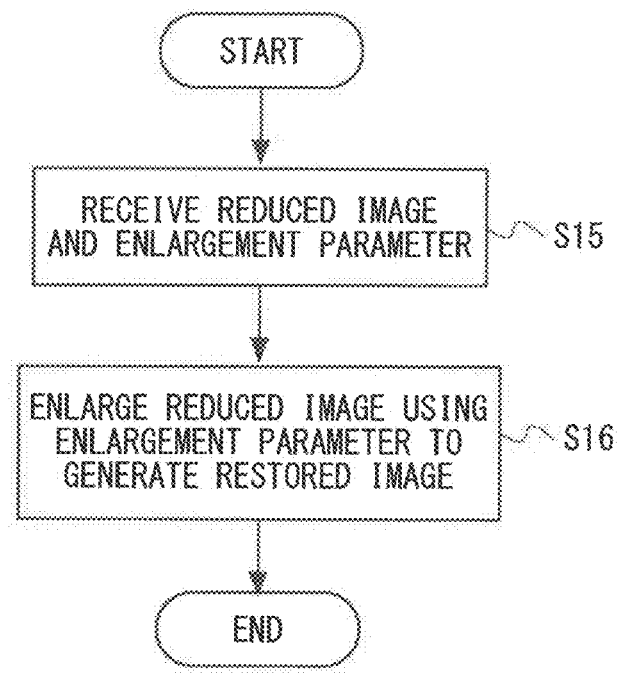
FIG. 3 is a flowchart for describing a flow of image receiving processing according to the first embodiment.

FIG. 3 is a flowchart for describing a flow of the image receiving processing according to the first embodiment. The receiving unit 21 of the image receiving apparatus 2 receives the reduced image and the enlargement parameter from the image transmitting apparatus 1 (S15). Next, the image restoring unit 22 of the image receiving apparatus 2 enlarges the reduced image using the enlargement parameter to generate the restored image D4 (S16).

As described above, in the first embodiment, the video data whose size is large is replaced by the image data whose size is small and the non-image data (the enlargement parameter or the like) and the data after the replacement are transmitted. In particular, the resolution or the number of pixels of the input image D1 is reduced, whereby it is possible to stably suppress the amount of data to be transmitted regardless of the content of the image. It is therefore possible to prevent the local increase in the amount of data, which is the problem of Japanese Unexamined Patent Application Publication No. 2001-320707, and to stably reduce the amount of image data. Then by reducing the vertical and horizontal sizes (the number of pixels) of the input image D1 on the transmission side, the size of the image data to be transmitted (the reduced image or encoded data thereof) can be greatly reduced compared to the size of the data of the input image D1 (or encoded data thereof). That is, it is possible to stably achieve a high compression efficiency.

When the reduced image is enlarged to the original size in the image transmitting apparatus 1, the enlargement parameter where the difference from the input image D1 becomes minimum is determined and the enlargement parameter is transmitted to the image receiving apparatus 2. Therefore, in the image restoring unit 22 of the image receiving apparatus 2, it is possible to restore the reduced image that has a size equal to the original size and includes the content close to that of the input image D1 using the enlargement parameter that has been received.

Next, a more specified configuration of the first embodiment will be described.

Figure 4:
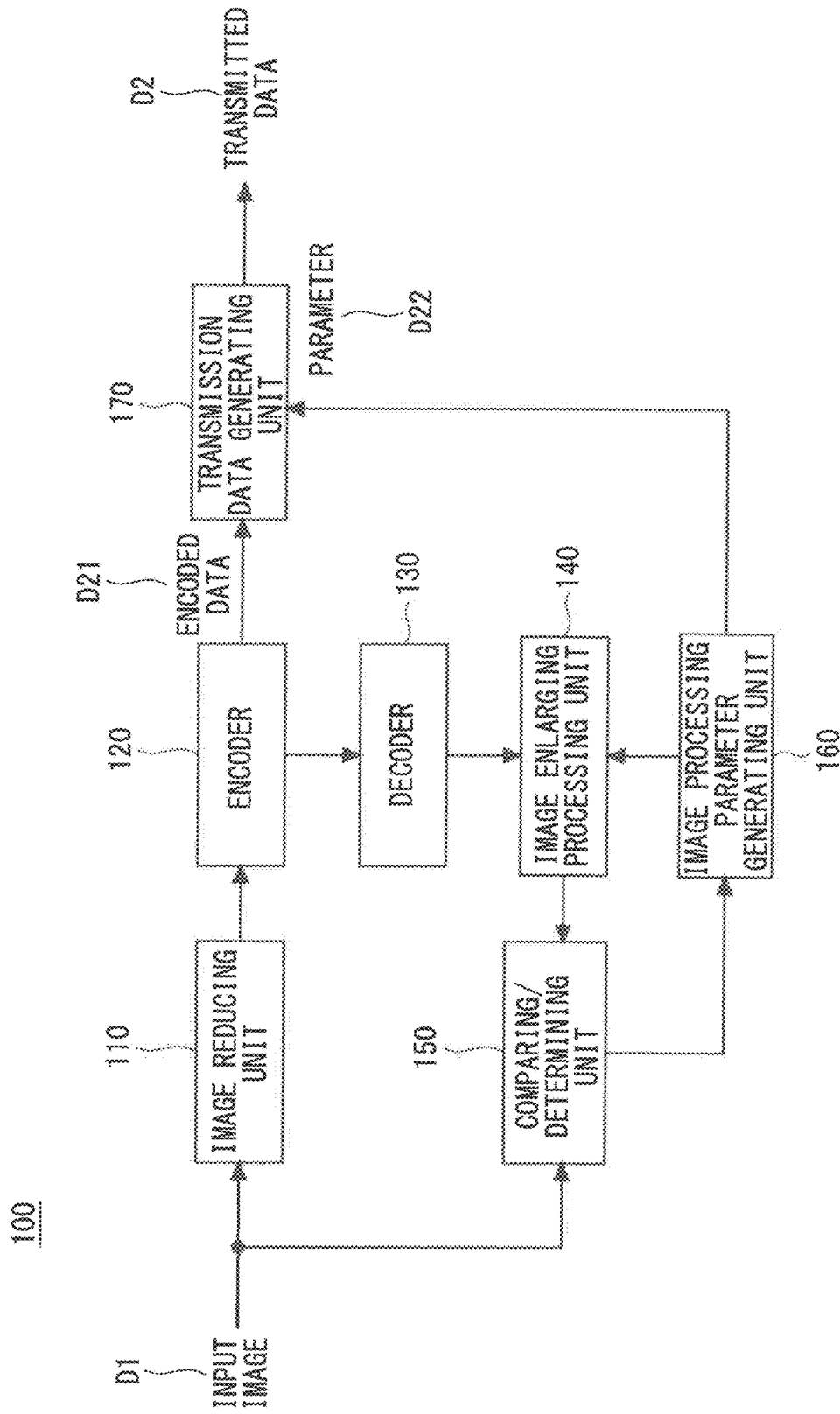
FIG. 4 is a block diagram showing a configuration of an image transmitting apparatus according to the first embodiment.

FIG. 4 is a block diagram showing a configuration of an image transmitting apparatus 100 according to the first embodiment. The image transmitting apparatus 100 is one example of the aforementioned image transmitting apparatus 1. The image transmitting apparatus 100 includes an image reducing unit 110, an encoder 120, a decoder 130, an image enlarging processing unit 140, a comparing/determining unit 150, an image processing parameter generating unit 160, and a transmission data generating unit 170. The image reducing unit 110 reduces the size of the input image D1 to generate the reduced image. The encoder 120 encodes the reduced image as compression processing to generate an encoded data D21. The decoder 130 decodes the encoded data D21 to generate decoded data. The encoding method in the encoder 120 and the decoding method in the decoder 130 may be known ones. H.26x, which is a standard regarding video data, may be, for example, used.

The image enlarging processing unit 140 enlarges the decoded data using a predetermined enlargement parameter to generate an enlarged image. The enlarging processing may be, for example, super-resolution processing or the like that will be described later. However, the enlarging processing is not limited to it. The comparing/determining unit 150 compares the input image D1 with the enlarged image to determine the difference. When the difference is within a predetermined range, the image processing parameter generating unit 160 outputs the enlargement parameter used in the image enlarging processing unit 140 to the transmission data generating unit 170 as a parameter D22. On the other hand, when the difference is outside the predetermined range, the image processing parameter generating unit 160 instructs the image enlarging processing unit 140 to adjust the enlargement parameter and the image enlarging processing unit 140 performs the enlarging processing again using the enlargement parameter that has been adjusted. That is, the comparing/determining unit 150 determines, when the decoded data (corresponding to the reduced image) is enlarged to the original size of the input image D1 by the image enlarging processing unit 140, the enlargement parameter where the difference from the input image D1 becomes minimum. The transmission data generating unit 170 transmits the encoded data D21 and the parameter D22 to the image receiving apparatus that will be described later as a transmitted data D2. The transmission data generating unit 170 may separately transmit the encoded data D21 and the parameter D22.

Figure 5:
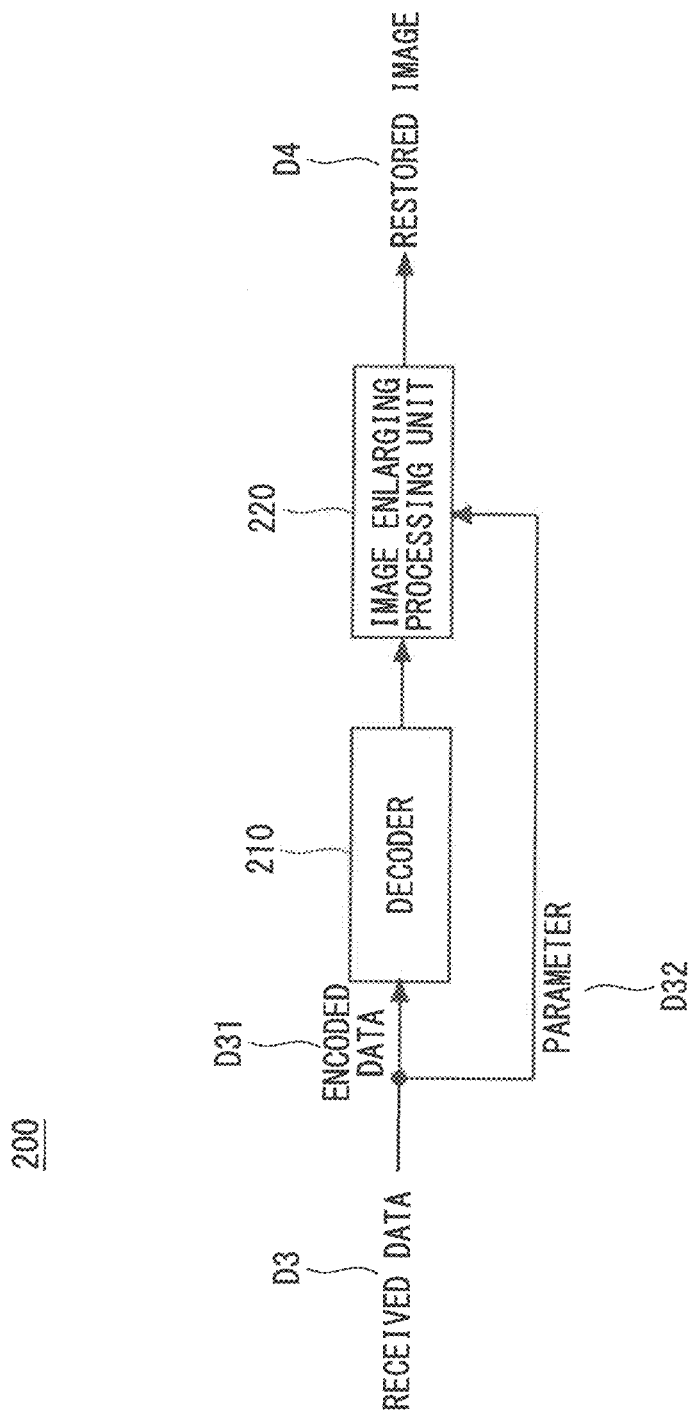
FIG. 5 is a block diagram showing a configuration of an image receiving apparatus according to the first embodiment.

FIG. 5 is a block diagram showing a configuration of an image receiving apparatus 200 according to the first embodiment. The image receiving apparatus 200 is one example of the aforementioned image receiving apparatus 2. The image receiving apparatus 200 includes a decoder 210 and an image enlarging processing unit 220. A received data D3 received by the image receiving apparatus 200 is equivalent to the aforementioned transmitted data D2 and includes an encoded data D31 and a parameter D32.

The decoder 210 decodes the encoded data D31 to generate decoded data. The image enlarging processing unit 220 enlarges the decoded data using the parameter D32 to generate a restored image D4.

Figure 6:
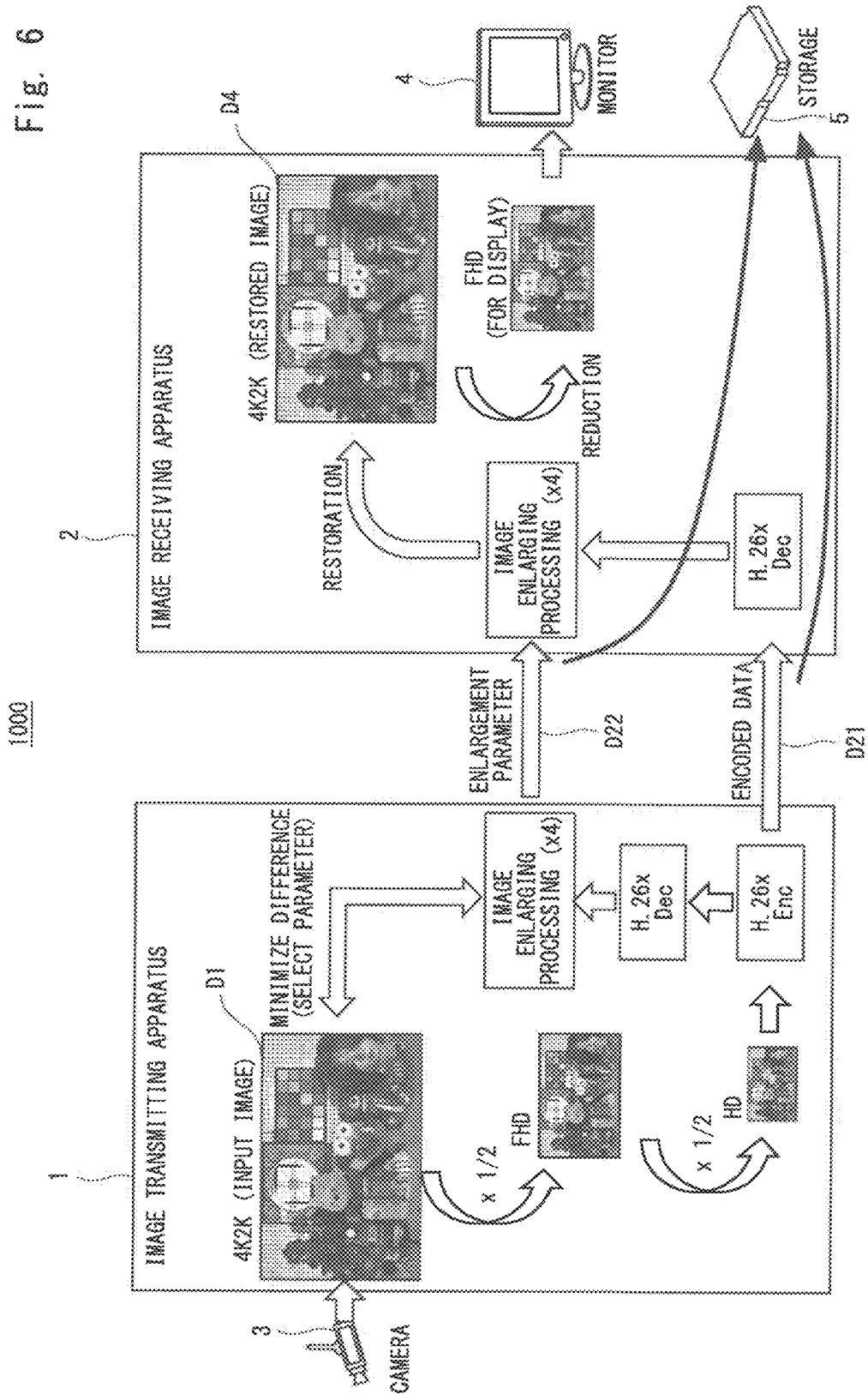
FIG. 6 is a diagram for describing the concept of the image processing system according to the first embodiment.

FIG. 6 is a diagram for describing the concept of the image processing system 1000 according to the first embodiment. In the image processing system 1000, the image transmitting apparatus 1 receives the high-resolution input image D1 taken by a camera 3. The input image D1 has a resolution of, for example, 4K2K. Then the image transmitting apparatus 1 reduces the size of the input image D1 by ½ to generate a FHD (Full High Definition) reduced image and further reduces the FHD image size by ½ to generate a HD (High Definition) reduced image. After that, the image transmitting apparatus 1 encodes the HD reduced image in compliance with H.26x to generate the encoded data D21. The image transmitting apparatus 1 transmits the encoded data D21 to the image receiving apparatus 2 and decodes the encoded data D21 in compliance with H.26x to convert the obtained data into an image data. The size of the resulting image data after the conversion is ¼ of the size of the input image D1. Then the image transmitting apparatus 1 performs image enlarging processing to quadruple the size of the image data after the conversion and obtains the difference between the image data after the enlargement and the input image D1 by comparing them. In the image enlarging processing, a predetermined image processing parameter (enlargement parameter) is used. Then the parameter is adjusted to minimize the difference and the image enlarging processing is repeated. After the image enlarging processing is repeated a predetermined number of times, the parameter D22 where the difference becomes minimum is selected and the parameter D22 is transmitted to the image receiving apparatus 2.

The image receiving apparatus 2 stores the encoded data D21 and the parameter D22 that have been received in a storage 5. Further, the image receiving apparatus 2 decodes the encoded data D21 in compliance with H.26x and performs image enlarging processing on the decoded data using the parameter D22 that has been received to quadruple the size thereof to generate the restored image D4. The resolution of the restored image D4 is, similar to that of the input image D1, 4K2K. In this example, the image receiving apparatus 2 further reduces the size of the restored image D4 to the FHD size and outputs the reduced image to a monitor 4 to display the resulting image on the monitor 4. It is therefore possible to reduce the load of the network between the image transmitting apparatus 1 and the image receiving apparatus 2 and to reduce the amount of data to be stored in the storage 5.

As the aforementioned image enlarging processing, super-resolution processing may be used. That is, the image transmitting apparatus and the image receiving apparatus enlarge the reduced image by performing super-resolution processing on the reduced image, and the determining unit may preferably determine the parameter of the super-resolution processing where the difference between the result of the super-resolution processing and the input image becomes minimum to be the enlargement parameter. It is therefore possible to increase the accuracy of the processing for enlarging the reduced image.

Figure 7:
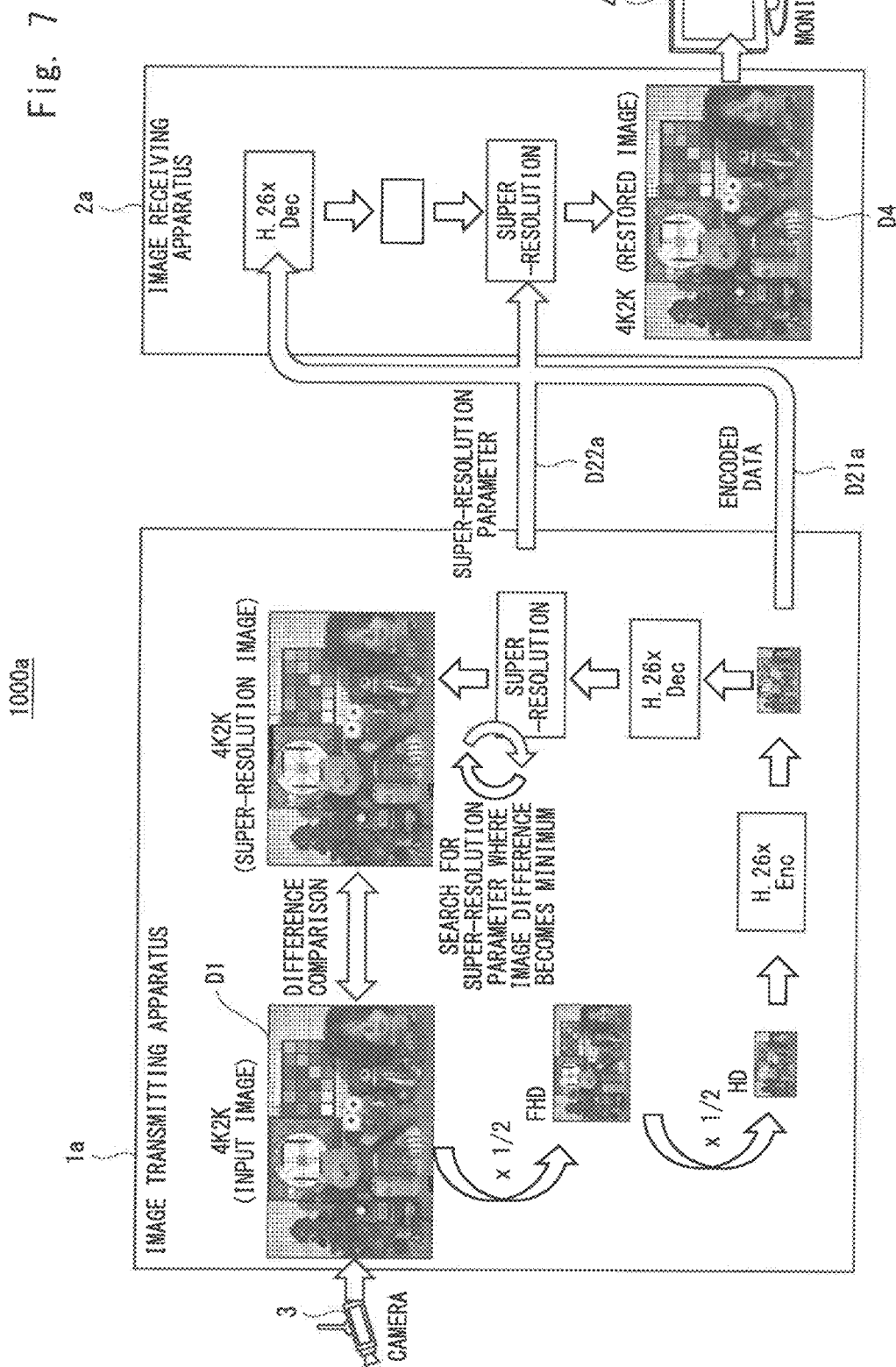
FIG. 7 is a diagram for describing the concept of the image processing system when super-resolution processing according to Example 1-1 is used.

FIG. 7 is a diagram for describing the concept of an image processing system 1000*a* when the super-resolution processing is used in the first embodiment. The image processing system 1000*a* includes an image transmitting apparatus 1*a* and an image receiving apparatus 2*a*. The image transmitting apparatus 1*a* reduces the size of the input image D1 by ¼, encodes the obtained image in compliance with H.26x, and generates an encoded data D21*a*, similar to the image transmitting apparatus 1. After that, the image transmitting apparatus 1*a* generates, for the decoded data obtained by decoding the encoded data D21*a* in compliance with H.26x, a 4K2K super-resolution image having a size the same as that of the input image D1 by super-resolution processing. Then from the difference from the input image D1, a super-resolution parameter where the image difference becomes minimum is obtained. Then the image transmitting apparatus 1*a* transmits a super-resolution parameter D22*a* and the encoded data D21*a* that have been obtained to the image receiving apparatus 2*a*. The image receiving apparatus 2*a* decodes the encoded data D21*a* that has been received in compliance with H.26x, performs super-resolution processing on the result of the decoding using the super-resolution parameter D22*a* that has been received, and generates a 4K2K restored image D4. Then the image receiving apparatus 2*a* outputs the restored image D4 to the monitor 4. As stated above, it is possible to greatly reduce the traffic amount in the network by using the super-resolution processing.

Figure 8:
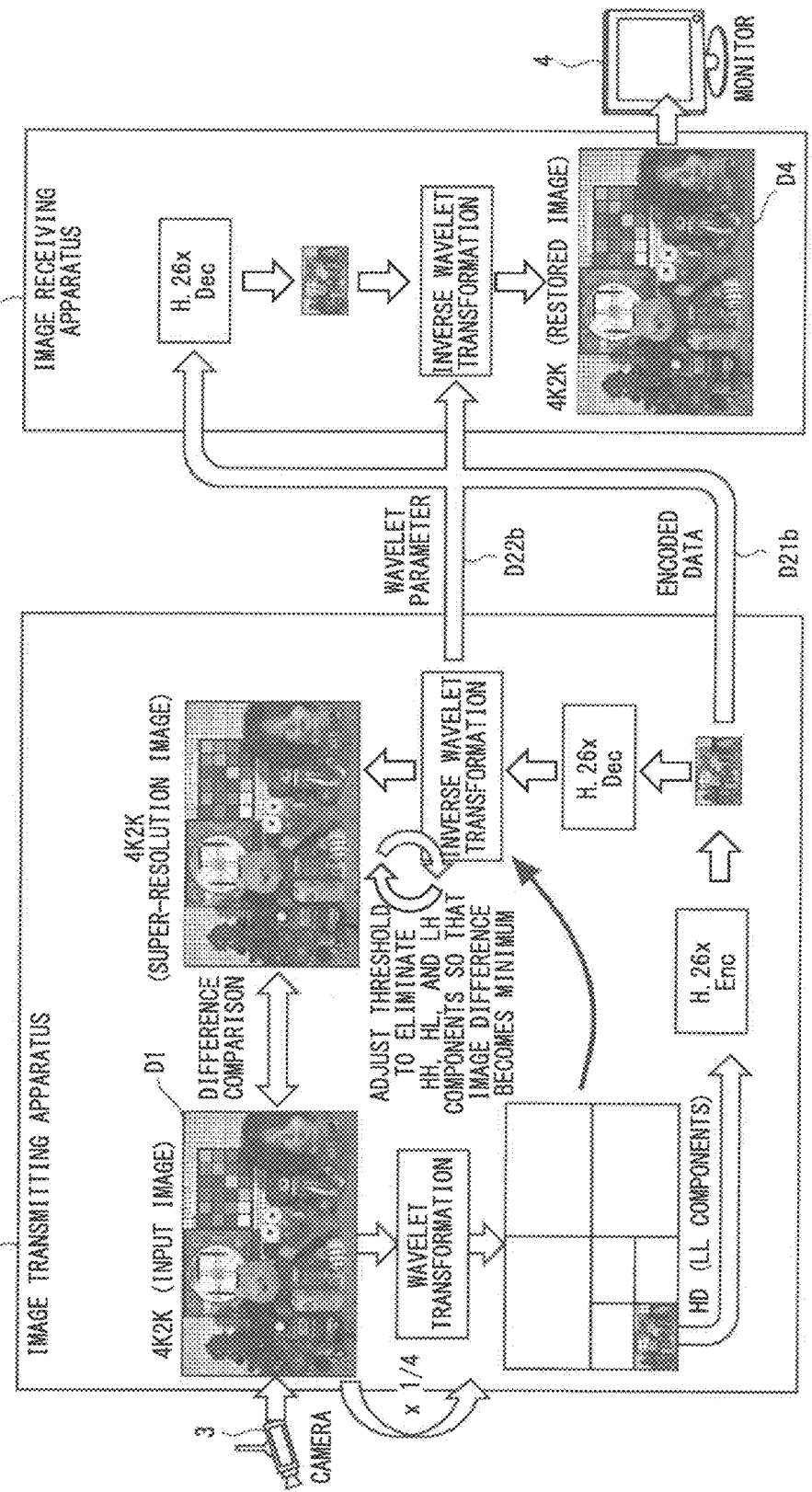
FIG. 8 is a diagram for describing the concept of the image processing system when wavelet transformation processing according to Example 1-2 is used.

As the aforementioned image enlarging processing, inverse wavelet transformation processing may be used in place of the super-resolution processing. In this case, wavelet transformation processing is used as processing for reducing the input image D1. FIG. 8 is a diagram for describing the concept of an image processing system 1000b when the wavelet transformation processing is used in the first embodiment. The image processing system 1000b includes an image transmitting apparatus 1b and an image receiving apparatus 2b. The image transmitting apparatus 1b performs the wavelet transformation processing on the input image D1 to reduce the size of the input image D1 by ¼. In this case, high-frequency information can be efficiently eliminated, similar to the processing in JPEG 2000. Then the image transmitting apparatus 1b encodes LL components of the reduced image in compliance with H.26x to generate an encoded data D21b. After that, the image transmitting apparatus 1b performs inverse wavelet transformation processing on decoded data obtained by decoding the encoded data D21b in compliance with H.26x to generate a 4K2K super-resolution image whose size is the same as that of the input image D1. Then from the difference from the input image D1, threshold adjustment to eliminate HH, HL, and LH components is performed to make the image difference minimum. Then the image transmitting apparatus 1b selects a wavelet parameter D22b where the image difference becomes minimum and transmits the selected parameter to the image receiving apparatus 2b. At the same time, the image transmitting apparatus 1b transmits the encoded data D21b to the image receiving apparatus 2b. The image receiving apparatus 2b decodes the encoded data D21b that has been received in compliance with H.26x and performs inverse wavelet transformation processing on the result of the decoding using the wavelet parameter D22b that has been received to thereby generate a 4K2K restored image D4. Then the image receiving apparatus 2b outputs the restored image D4 to the monitor 4. As stated above, it is possible to greatly reduce the traffic amount in the network by using the super-resolution processing too.

The image transmitting apparatus according to this embodiment may transmit, besides the enlargement parameter, a reduction parameter such as a reduction rate to reduce the size of the input image D1 to the image receiving apparatus. In this case, the image receiving apparatus further uses the reduction parameter that has been received to perform processing for enlarging the reduced image.

As described above, in the first embodiment, the image data size (the resolution or the pixel value) before the compression encoding is reduced. Therefore, the amount of data after the compression encoding becomes greatly smaller than that when the normal compression encoding processing is performed. While the enlargement parameter is added to the transmitted data in addition to the image data, the size of the data of the enlargement parameter is negligibly small compared to the size of the image data. Therefore, the amount of data to be communicated can be reduced and the capacity of the storage that is necessary to store the compressed image data on the receiving side can be reduced as well. Further, on the receiving side, a high restoration rate can be accomplished by performing the enlarging processing using the enlargement parameter, whereby it is possible to accomplish both the acquisition of the flexible data for surveillance monitoring even though the resolution is low and the acquisition of the data for analyzing the details of the data where a high resolution is required by holding the same reduced image (or the encoded data thereof).

Second Embodiment

A second embodiment is a modified example of the aforementioned first embodiment. That is, an image transmitting apparatus according to the second embodiment further includes a status information accepting unit that accepts status information regarding the processing of the reduced image from the image receiving apparatus and the image reducing unit reduces the input image using a reduction parameter in accordance with the status information to generate the reduced image. The status information is, for example, information indicating the load of the network measured by the image receiving apparatus, information on the capacity of the storage in the image receiving apparatus, and information on the speed of the access to the storage. The information indicating the load of the network is, for example, the actual transmission speed of the data transmitted from the image transmitting apparatus to the image receiving apparatus or the data transmission rate that is required. Further, the information on the capacity of the storage includes, for example, the data capacity in the storage that is being used, the data capacity in the storage that is available, the usage rate of the storage or the like. Further, the information on the speed of the access to the storage is, for example, a measured value or an expected value of the speed in which the received data is written in the storage.

According to the second embodiment, when there is enough room in the storage or when the amount of the network that is being used is small, the reduction rate can be reduced, that is, the size of the reduced image may be made larger than that of the first embodiment, whereby it is possible to keep the quality of the restored image high.

Figure 9:
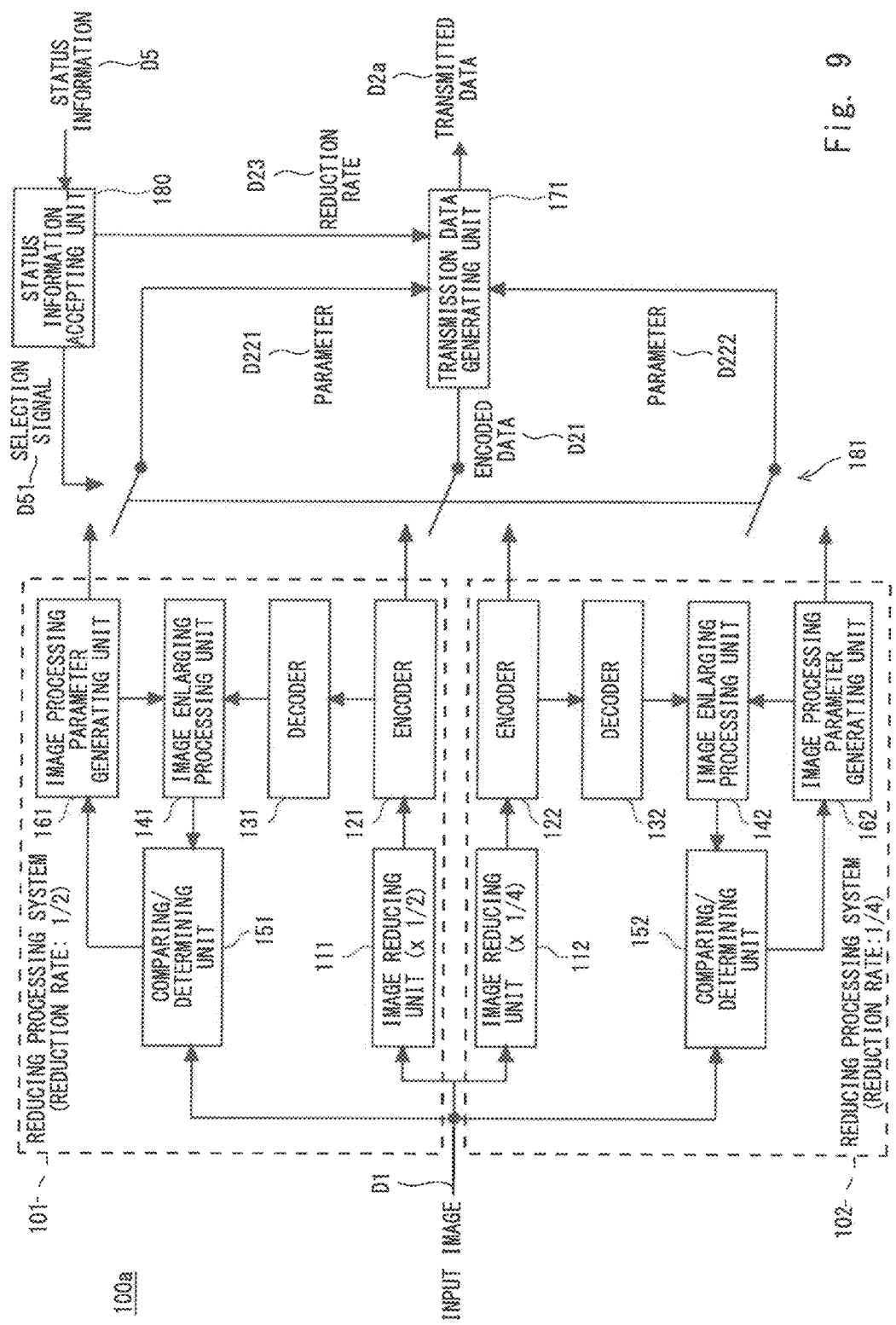
FIG. 9 is a block diagram showing a configuration of an image transmitting apparatus according to a second embodiment.

FIG. 9 is a block diagram showing a configuration of an image transmitting apparatus 100a according to the second embodiment. The image transmitting apparatus 100a includes reducing processing systems 101 and 102, a status information accepting unit 180, a switch unit 181, and a transmission data generating unit 171. The status information accepting unit 180 accepts status information D5 from an image receiving apparatus 200a that will be described later and extracts, for example, a selection signal D51 and a reduction rate D23 from the status information D5. When the selection signal D51 and the reduction rate D23 are included in the status information D5, for example, the status information accepting unit 180 may extract the selection signal D51 and the reduction rate D23 from the status information D5. Alternatively, for example, for each of a plurality of types of status information D5, a combination of the selection signal D51 and the reduction rate D23 may be stored in a storage apparatus or the like in such a way that they are associated with each other. In this case, the status information accepting unit 180 specifies and reads out the combination of the selection signal D51 and the reduction rate D23 from the storage apparatus in accordance with the status information D5 that has been accepted. After that, the status information accepting unit 180 outputs the selection signal D51 to the switch unit 181 and outputs the reduction rate D23 to the transmission data generating unit 171.

The reducing processing system 101 includes an image reducing unit 111, an encoder 121, a decoder 131, an image enlarging processing unit 141, a comparing/determining unit 151, and an image processing parameter generating unit 161. The image reducing unit 111 generates a reduced image obtained by reducing the size of the input image D1 by ½. Further, the image enlarging processing unit 141 doubles the size of the obtained data from the decoder to perform a predetermined image enlarging processing. Further, the encoder 121, the decoder 131, the comparing/determining unit 151, and the image processing parameter generating unit 161 are equivalent to the encoder 120, the decoder 130, the comparing/determining unit 150, and the image processing parameter generating unit 160 stated above.

The reducing processing system 102 includes an image reducing unit 112, an encoder 122, a decoder 132, an image enlarging processing unit 142, a comparing/determining unit 152, and an image processing parameter generating unit 162. The image reducing unit 112 generates a reduced image having the size of ¼ of the input image D1. Further, the image enlarging processing unit 142 quadruples the size of the obtained data from the decoder to perform a predetermined image enlarging processing. Further, the encoder 122, the decoder 132, the comparing/determining unit 152, and the image processing parameter generating unit 162 are equivalent to the encoder 120, the decoder 130, the comparing/determining unit 150, and the image processing parameter generating unit 160 stated above.

The switch unit 181 selects one of the outputs from the reducing processing systems 101 and 102 in accordance with the selection signal D51. Specifically, when the selection signal D51 indicates the selection of the reducing processing system 101, the switch unit 181 selects the encoded data D21 output from the encoder 121 and a parameter D221 output from the image processing parameter generating unit 161 and outputs the encoded data D21 and the parameter D221 to the transmission data generating unit 171. Further, when the selection signal D51 indicates the selection of the reducing processing system 102, the switch unit 181 selects the encoded data D21 output from the encoder 122 and a parameter D222 output from the image processing parameter generating unit 162 and outputs the encoded data D21 and the parameter D222 to the transmission data generating unit 171.

The transmission data generating unit 171 generates a transmitted data D2a that includes the encoded data D21, the parameter D221 or D222, and the reduction rate D23 and transmits the generated data to the image receiving apparatus 200a. The transmission data generating unit 171 may separately transmit a part or all of the encoded data D21, the parameter D221 or D222, and the reduction rate D23.

Figure 10:
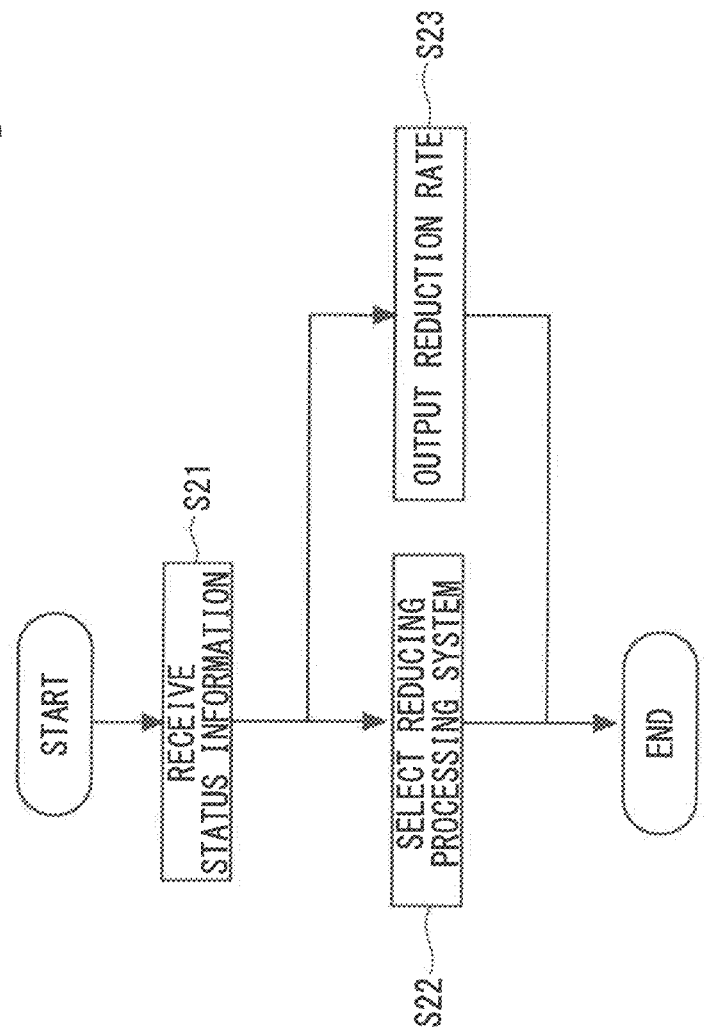
FIG. 10 is a flowchart for describing a flow of status information accepting processing according to the second embodiment.

FIG. 10 is a flowchart for describing a flow of the status information accepting processing according to the second embodiment. First, the status information accepting unit 180 receives the status information D5 from the image receiving apparatus 200a (S21). The status information accepting unit 180 extracts, for example, the selection signal D51 and the reduction rate D23 from the status information D5, as described above. Next, the status information accepting unit 180 outputs the selection signal D51 to the switch unit 181, to thereby select one of the reducing processing systems 101 and 102 (S22). Further, the status information accepting unit 180 outputs the reduction rate D23 to the transmission data generating unit 171 (S23).

Figure 11:
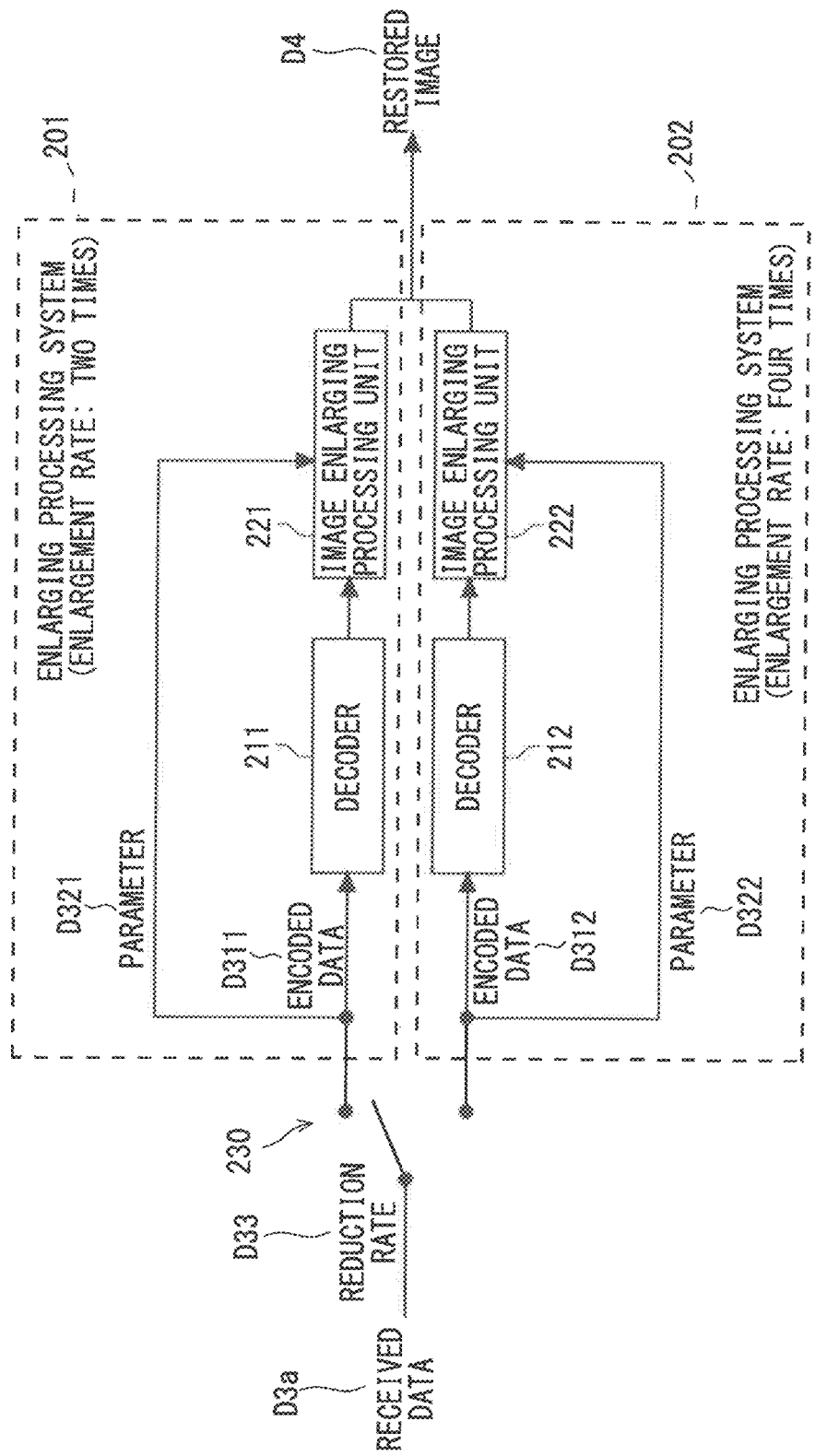
FIG. 11 is a block diagram showing a configuration of an image receiving apparatus according to the second embodiment.

FIG. 11 is a block diagram showing a configuration of the image receiving apparatus 200a according to the second embodiment. The image receiving apparatus 200a includes enlarging processing systems 201 and 202 and a switch unit 230. A received data D3a is equivalent to the aforementioned transmitted data D2a and includes an encoded data D311 (and D312), a parameter D321 (and D322), and a reduction rate D33.

The image receiving apparatus 200a outputs the reduction rate D33 included in the received data D3a to the switch unit 230. The switch unit 230 switches to one of the enlarging processing system 201 and the enlarging processing system 202 based on the reduction rate D33. When the reduction rate D33 indicates the reduction rate 1/2, for example, the switch unit 230 switches to the enlarging processing system 201. When the reduction rate D33 indicates the reduction rate 1/4, the switch unit 230 switches to the enlarging processing system 202.

The enlarging processing system 201 includes a decoder 211 and an image enlarging processing unit 221. The decoder 211 decodes the encoded data D311. The image enlarging processing unit 221 performs image enlarging processing where an enlargement rate is two times on the result of the decoding using the parameter D321.

Further, the enlarging processing system 202 include a decoder 212 and an image enlarging processing unit 222. The decoder 212 decodes the encoded data D312. The image enlarging processing unit 222 performs image enlarging processing where an enlargement rate is four times on the result of the decoding using the parameter D322. Accordingly, the output from the image receiving apparatus 200a becomes the restored image D4 from the image enlarging processing unit 221 or 222.

Third Embodiment

A third embodiment is a modified example of the aforementioned first embodiment. That is, an image transmitting apparatus according to the third embodiment further includes an image enlarging processing unit that performs a plurality of image enlarging processings that are different from one another to enlarge the size of the reduced image to the size of the input image. The determining unit selects an image enlarging processing where a difference between results of enlargement by the plurality of respective image enlarging processings and the input image becomes the smallest and determines the selected one to be the enlargement parameter. The image restoring unit enlarges the reduced image by the image enlarging processing determined to be the enlargement parameter to generate the restored image. Accordingly, there is no need to perform the processing for repeatedly obtaining the optimal parameter of the image processing algorithm, and it becomes possible to achieve the whole processing on hardware. It is also possible to increase the speed of the processing.

Figure 12:
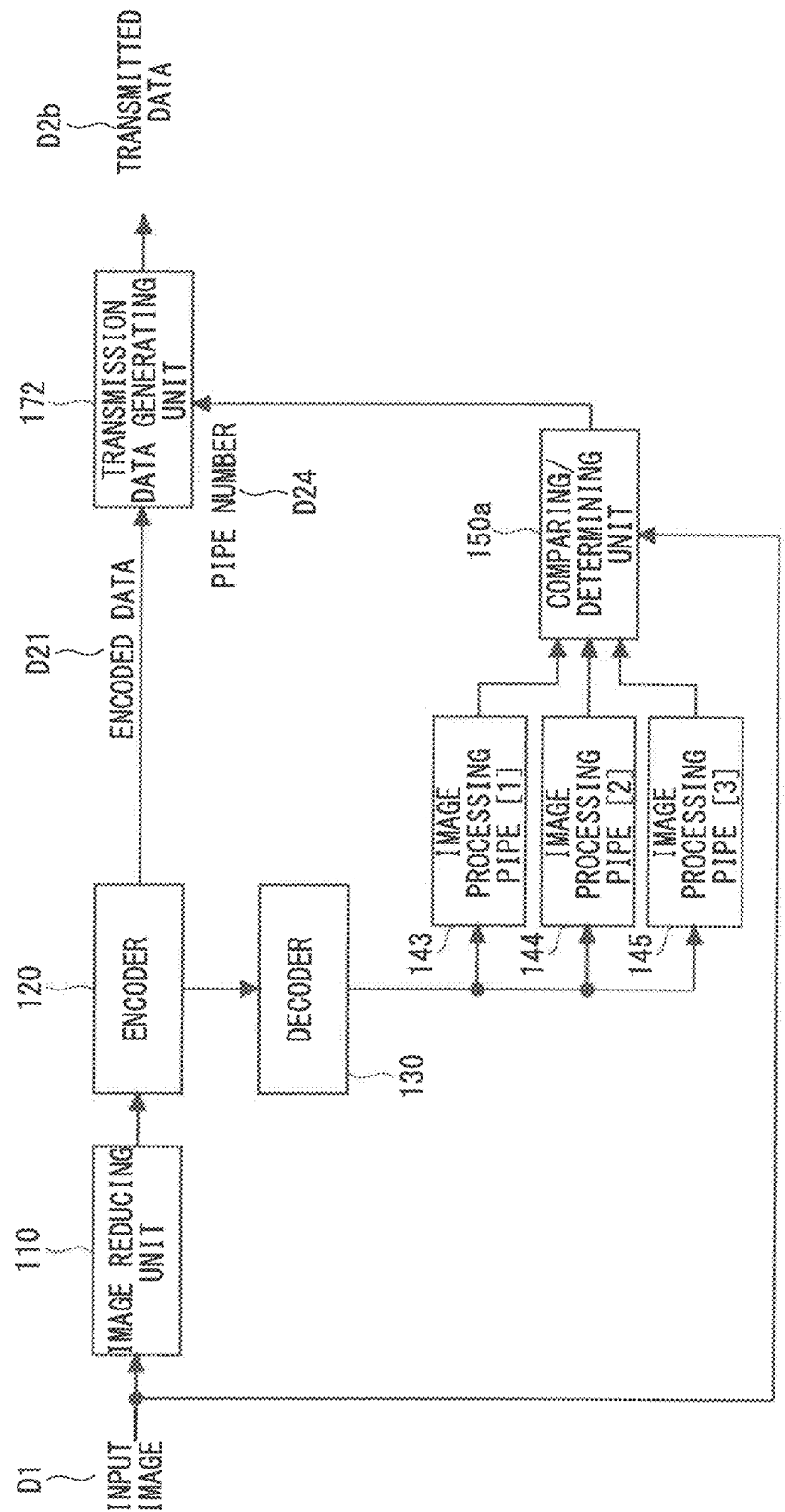
FIG. 12 is a block diagram showing a configuration of an image transmitting apparatus according to a third embodiment.

FIG. 12 is a block diagram showing a configuration of an image transmitting apparatus 100b according to the third embodiment. The image transmitting apparatus 100b includes an image reducing unit 110, an encoder 120, a decoder 130, image processing pipes 143, 144, and 145, a comparing/determining unit 150a, and a transmission data generating unit 172. The image reducing unit 110, the encoder 120, and the decoder 130 are the same as those shown in FIG. 4.

Algorithms of the image enlarging processing different from one another are implemented in the image processing pipes 143 to 145. The image processing pipes 143 to 145 are able to process the output from the decoder 130 in parallel. Then the comparing/determining unit 150a compares the results of the processing in the image processing pipe 143, the image processing pipe 144, and the image processing pipe 145 with the input image D1, selects the image enlarging processing where the difference becomes minimum, and outputs the selected one to the transmission data generating unit 172 as a pipe number D24. When the image processing pipe 143 is selected, for example, the pipe number D24 is set to, but not limited to, a numerical value such as "1". The pipe number D24 is one example of the enlargement parameter. The transmission data generating unit 172 transmits the encoded data D21 and the pipe number D24 to the image receiving apparatus as a transmitted data D2b.

Figure 13:
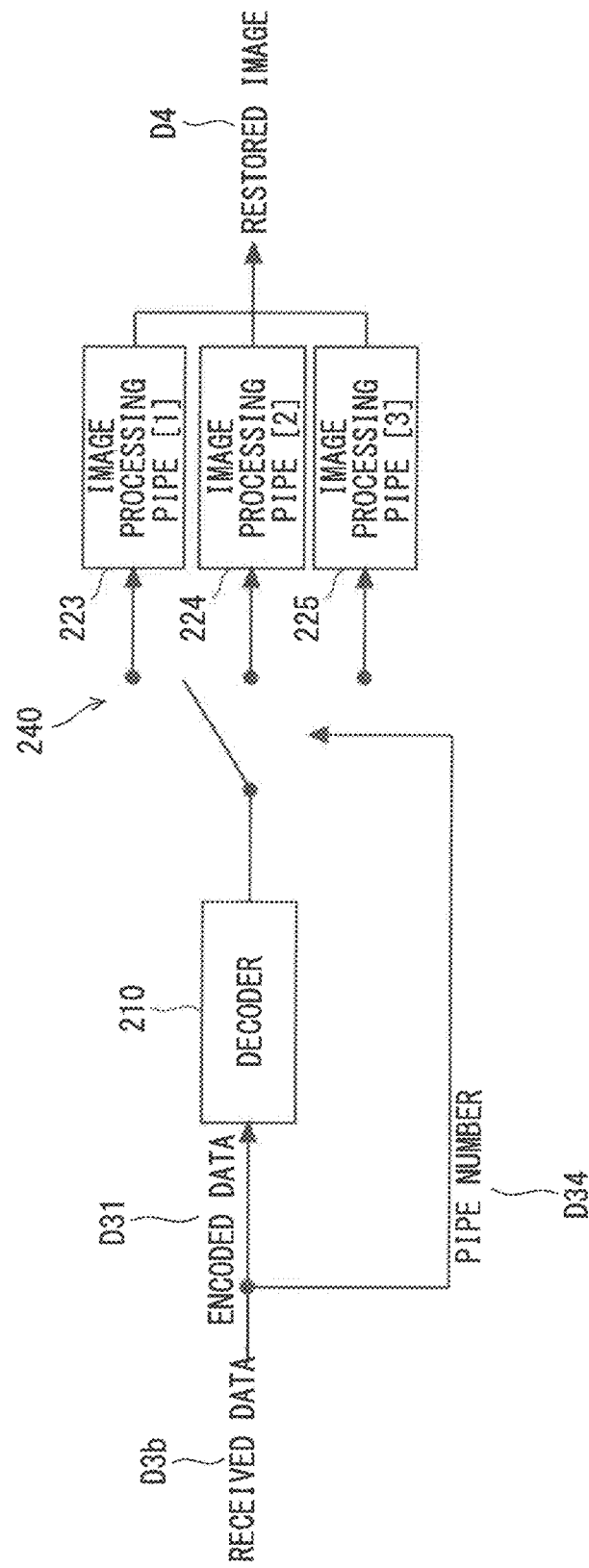
FIG. 13 is a block diagram showing a configuration of an image receiving apparatus according to the third embodiment.

FIG. 13 is a block diagram showing a configuration of an image receiving apparatus 200b according to the third embodiment. The image receiving apparatus 200b includes a decoder 210, image processing pipes 223, 224, and 225, and a switch unit 240. A received data D3b is equivalent to the aforementioned transmitted data D2b and includes the encoded data D31 and a pipe number D34. Further, the algorithms of the image enlarging processing implemented in the image processing pipes 223 to 225 respectively correspond to the aforementioned image processing pipes 143 to 145.

The decoder 210 decodes the encoded data D31. The switch unit 240 switches to one of the image processing pipes 223 to 225 based on the pipe number D34. When the pipe number D34 indicates "2", the switch unit 240 switches to the image processing pipe 224. The pipe among the image processing pipes 223 to 225 that has been switched by the switch unit 240 performs processing based on the image enlarging processing algorithm that has been implemented on the result of the decoding, which is the output from the decoder 210, and generates the restored image D4.

Fourth Embodiment

A fourth embodiment is a modified example of the aforementioned second and third embodiments. The fourth embodiment is obtained, for example, by combining the second and third embodiments and modifying the combined mode. Accordingly, both the reduction rate and the enlargement parameter can be adjusted and a fine control can be performed.

Figure 14:
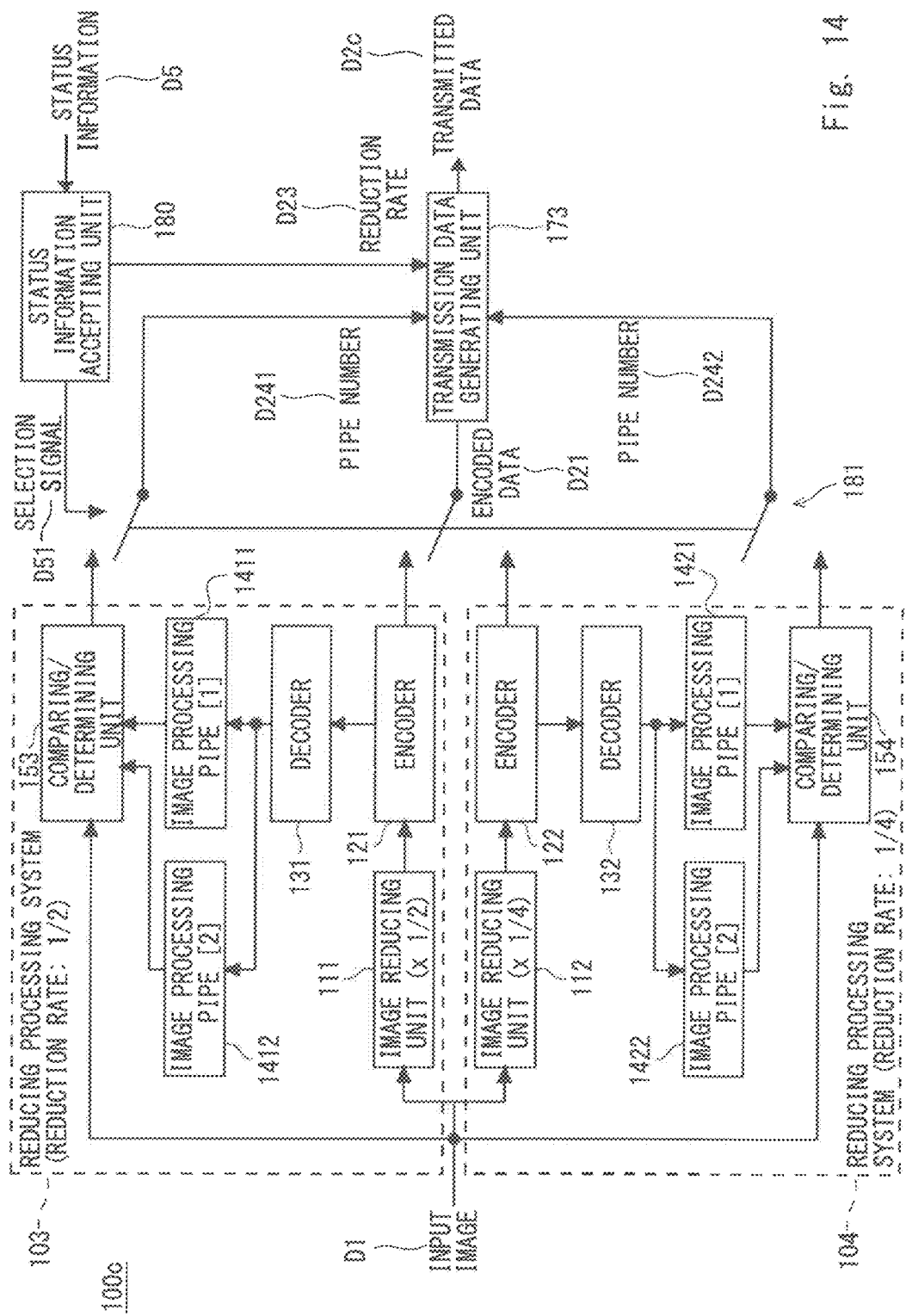
FIG. 14 is a block diagram showing a configuration of an image transmitting apparatus according to a fourth embodiment.

FIG. 14 is a block diagram showing a configuration of an image transmitting apparatus 100c according to the fourth embodiment. The image transmitting apparatus 100c includes reducing processing systems 103 and 104, a status information accepting unit 180, a switch unit 181, and a transmission data generating unit 173. The status information accepting unit 180 is the same as that shown in FIG. 9.

The reducing processing system 103 includes an image reducing unit 111, an encoder 121, a decoder 131, image processing pipes 1411 and 1412, and a comparing/determining unit 153. The image reducing unit 111, the encoder 121, and the decoder 131 are the same as those shown in FIG. 9. Algorithms of the image enlarging processing different from each other are implemented in the image processing pipes 1411 and 1412. The image processing pipes 1411 and 1412 are able to process the output from the decoder 131 in parallel. The number of image processing pipes 1411 and 1412 may be three or larger. The comparing/determining unit 153 compares the results of the processing in the image processing pipes 1411 and 1412 with the input image D1, selects the image enlarging processing where the difference becomes minimum, and outputs the selected one to the transmission data generating unit 173 as a pipe number D241.

The reducing processing system 104 includes an image reducing unit 112, an encoder 122, a decoder 132, image processing pipes 1421 and 1422, and a comparing/determining unit 154. The image reducing unit 112, the encoder 122, and the decoder 132 are the same as those shown in FIG. 9. Further, the algorithms of the image enlarging processing corresponding to the aforementioned image processing pipes 1411 and 1412 are implemented in the image processing pipes 1421 and 1422, respectively. The image processing pipes 1421 and 1422 are able to process the output from the decoder 132 in parallel. It is sufficient that the number of image processing pipes 1421 and 1422 is the same as the number of image processing pipes in the reducing processing system 103 and may be three or larger. The comparing/determining unit 154 compares the results of the processing in the image processing pipes 1421 and 1422 with the input image D1, selects the image enlarging processing where the difference becomes minimum, and outputs the selected one to the transmission data generating unit 173 as a pipe number D242.

The switch unit 181 selects one of the outputs of the reducing processing systems 103 and 104 in accordance with the selection signal D51. The transmission data generating unit 173 generates a transmitted data D2c that includes the encoded data D21, the pipe number D241 or D242, and the reduction rate D23 and transmits the generated data to an image receiving apparatus 200c. The transmission data generating unit 173 may separately transmit a part or all of the encoded data D21, the pipe number D241 or D242, and the reduction rate D23.

Figure 15:
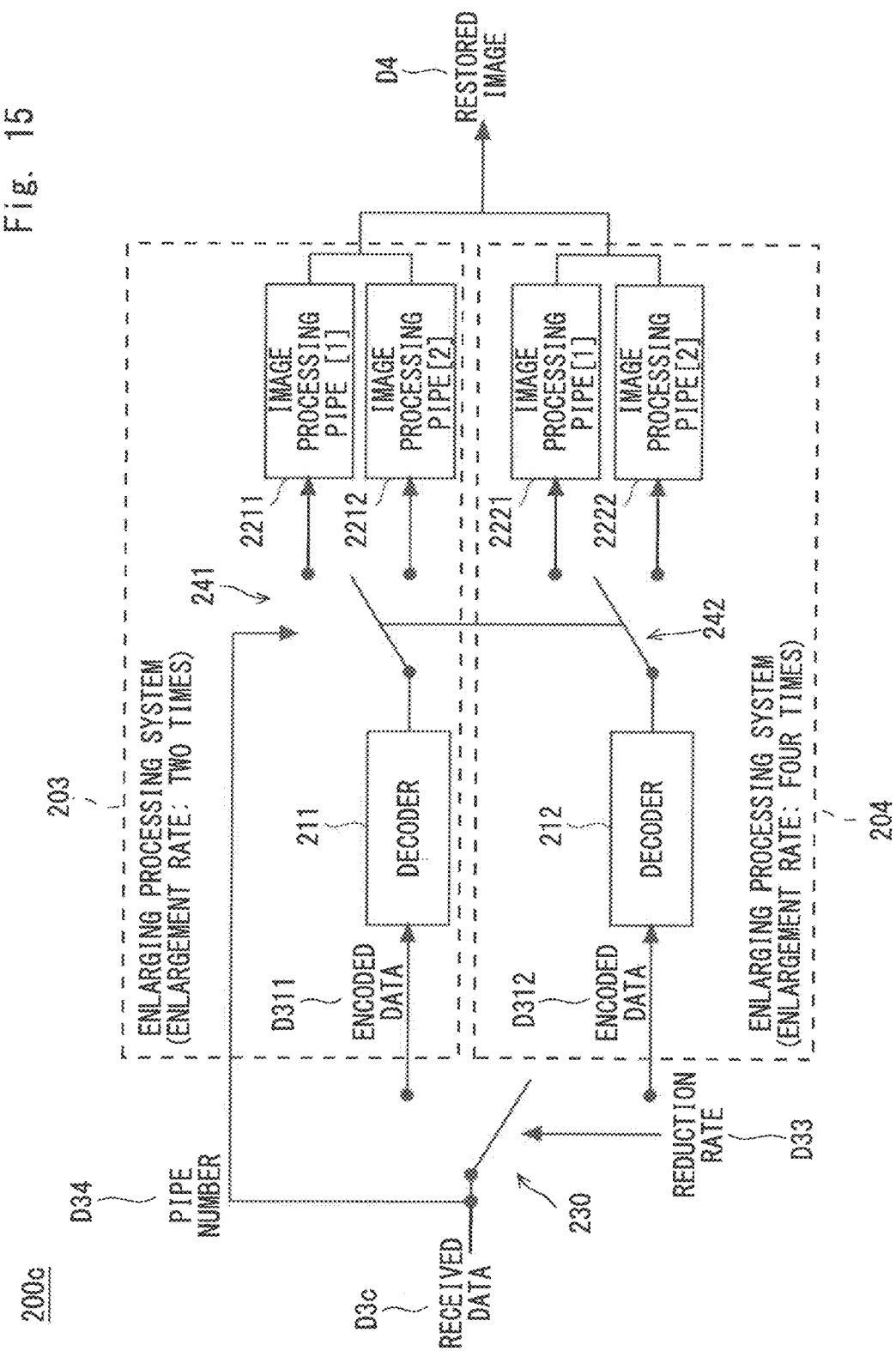
FIG. 15 is a block diagram showing a configuration of an image receiving apparatus according to the fourth embodiment.

FIG. 15 is a block diagram showing a configuration of the image receiving apparatus 200c according to the fourth embodiment. The image receiving apparatus 200c includes enlarging processing systems 203 and 204 and a switch unit 230. A received data D3c is equivalent to the aforementioned transmitted data D2c and includes encoded data D311 (and D312), the reduction rate D33, and the pipe number D34.

The image receiving apparatus 200c outputs the reduction rate D33 included in the received data D3c to the switch unit 230 and outputs the pipe number D34 to the switch units 241 and 242. While the pipe number D34 is input to only the switch unit 241 in FIG. 15, the switch units 241 and 242 are switched in association with each other. The switch unit 230 switches to one of the enlarging processing system 203 and the enlarging processing system 204 based on the reduction rate D33.

The enlarging processing system 203 includes a decoder 211, a switch unit 241, and image processing pipes 2211 and 2212. The decoder 211 decodes the encoded data D311. The switch unit 241 switches to one of the image processing pipes 2211 and 2212 based on the pipe number D34. Further, the algorithms of the image enlarging processing implemented in the image processing pipes 2211 and 2212 respectively correspond to the aforementioned image processing pipes 1411 and 1412. The image processing pipes 2211 and 2212 perform image enlarging processing where an enlargement rate is two times. In other words, the switch unit 241 and the image processing pipes 2211 and 2212 perform image enlarging processing where an enlargement rate is two times based on the pipe number D34.

The enlarging processing system 204 includes a decoder 212, a switch unit 242, and image processing pipes 2221 and 2222. The decoder 212 decodes the encoded data D312. The switch unit 242 switches, similar to the switch unit 241, to one of the image processing pipes 2221 and 2222 based on the pipe number D34. Further, the algorithms of the image enlarging processing implemented in the image processing pipes 2221 and 2222 respectively correspond to the aforementioned image processing pipes 1421 and 1422. The image processing pipes 2221 and 2222 perform image enlarging processing where an enlargement rate is four times. In other words, the switch unit 242 and the image processing pipes 2221 and 2222 perform image enlarging processing where an enlargement rate is four times based on the pipe number D34. Accordingly, the output from the image receiving apparatus 200c becomes the restored image D4 from one of the image processing pipes 2211, 2212, 2221, and 2222.

Fifth Embodiment

A fifth embodiment is a modified example of the aforementioned first embodiment. That is, an image transmitting apparatus according to the fifth embodiment further includes an adjustment unit that adjusts the reduction parameter to reduce the input image in accordance with the result of encoding the reduced image and the image reducing unit reduces the input image using the reduction parameter that has been adjusted to generate the reduced image. Depending on the content of the input image, for example, the compression efficiency may be reduced as a result of encoding. In an image whose frequency is high, in particular, the size of the data of the image after compression may become larger than the size of the data of the image before compression. In such cases, by performing the feedback and adjusting the reduction parameter to further increase the reduction rate, it is possible to maintain a constant compression efficiency.

Figure 16:
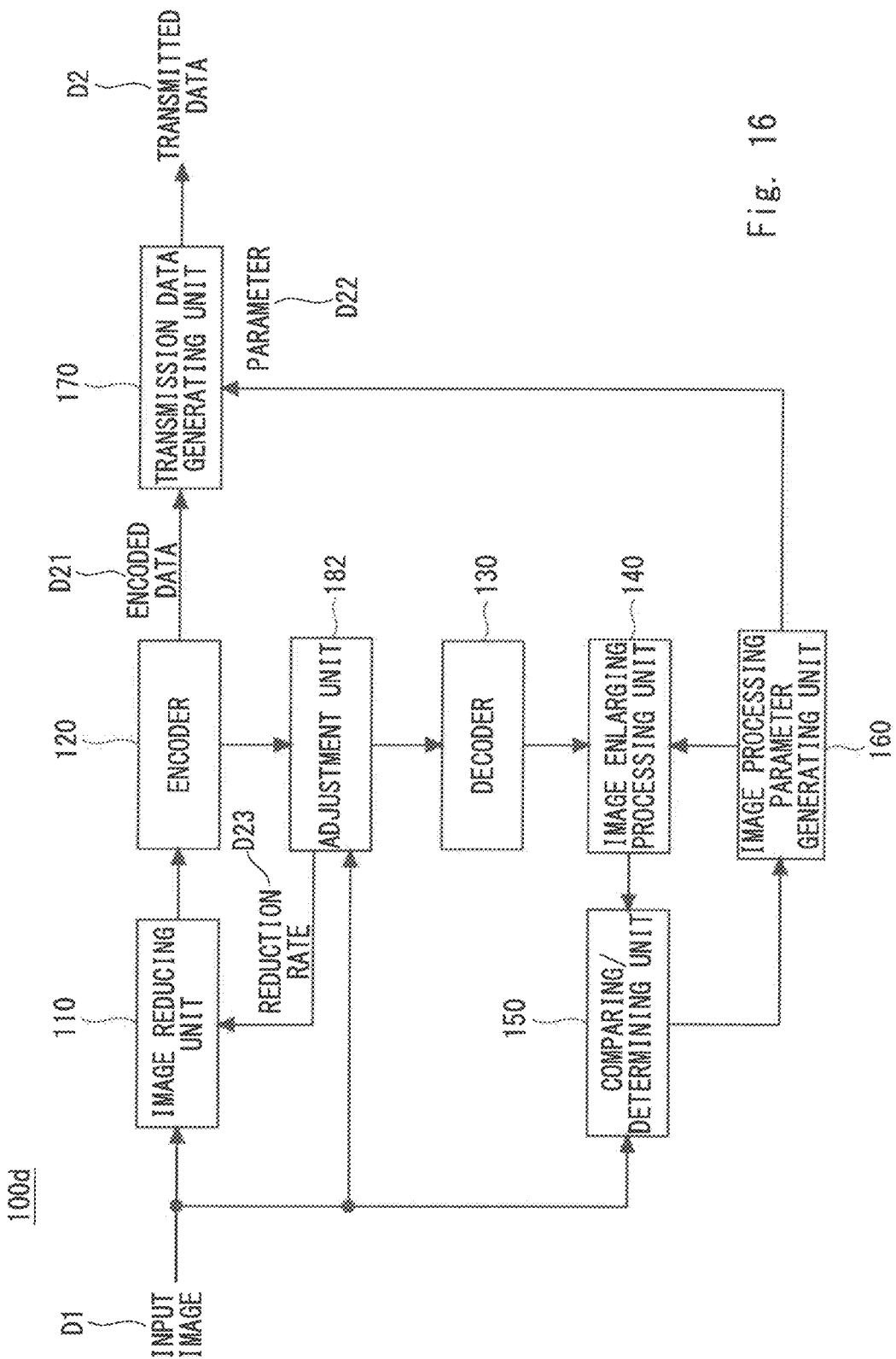
FIG. 16 is a block diagram showing a configuration of an image transmitting apparatus according to a fifth embodiment.

FIG. 16 is a block diagram showing a configuration of an image transmitting apparatus 100d according to the fifth embodiment. The image transmitting apparatus 100d is a modified example of the image transmitting apparatus 100 shown in FIG. 1, includes an adjustment unit 182 newly provided between the encoder 120 and the decoder 130, and feeds back the reduction rate D23 from the adjustment unit 182 to the image reducing unit 110. That is, the adjustment unit 182 determines the efficiency of the compression encoding from the result of the output from the encoder 120, that is, the encoded data D21, and the input image D1. When the efficiency of the compression encoding does not satisfy a predetermined condition, the reduction rate D23 is made higher than that in the previous time and the reduction rate D23 that has been adjusted is output to the image reducing unit 110. Then the image reducing unit 110 again reduces the input image D1 based on the reduction rate D23 from the adjustment unit 182. Further, when the efficiency of the compression encoding satisfies the predetermined condition, the adjustment unit 182 outputs the encoded data D21 to the decoder 130.

Other Embodiments

Each of the aforementioned embodiments stated above may further include the following configuration. That is, the image receiving apparatus further includes a storage unit that stores the reduced image and the enlargement parameter and the receiving unit stores the reduced image that has been received in the storage unit, adds a predetermined access right to the enlargement parameter that has been received, and stores the enlargement parameter in the storage unit. Accordingly, regarding the processing for enlarging the reduced image, the size of the display and the content of the display can be flexibly controlled depending on the access right.

Consider a case, for example, in which a right to read out the enlargement parameter is set for each user as an access right. In this case, a user (application) that performs a real-time video displaying processing on a surveillance monitor may not be given the right to read out the enlargement parameter, whereby the reduced image having a low resolution is used in the surveillance monitor as the displayed image. Accordingly, since details of the face or the like of a person are not displayed in the reduced image, it is possible to protect the privacy of the person when a security guard or the like loos at the surveillance monitor. Further, even when only the reduced image stored in the storage unit is stolen, it is required that the enlargement parameter be acquired as well in order to obtain a high-resolution image. Accordingly, it is possible not only to protect the privacy of the person but also to improve security.

On the other hand, a user (application) that performs tracking investigation processing on recorded video may be given the right to read out the enlargement parameter, whereby it is possible to perform processing for enlarging the reduced image using the enlargement parameter and the high-resolution image can be reproduced and displayed on the screen. It is therefore possible to meet the need for the tracking investigation.

The access right may be set in a storage area in the storage unit. When the reduced image is stored in a first storage area and the enlargement parameter is stored in a second storage area, an access right may be set in the second storage area.

Further, whether or not to enlarge an image may be limited depending on the right held by the user. An operator who views a screen, for example, may not be allowed to view all the video images and a desired control may be performed. For example, a mosaic may be applied to the face part depending on the right or only the image after the reduction and compression may be displayed.

While an image having a high resolution has been directly transmitted and stored only to display a fine image later in related art, there is no need to transmit and store an image having a high resolution in this embodiment.

This embodiment can be applied not only to video data but also to image data. Further, this embodiment can be used as a video compression technique where a low delay is required.

In related art such as Japanese Unexamined Patent Application Publication No. 2001-320707, it is required to compare a frame and a subsequent frame. Therefore, it is difficult to obtain a sufficiently advantageous effect in a case in which scenes are suddenly changed. On the other hand, in this embodiment, processing is performed for each image. Therefore, this embodiment is suitable for a system in which a low delay is required. That is, the embodiment is suitably applied to an in-vehicle camera or the like where real-time reproduction is required.

The image transmitting apparatus according to this embodiment can be applied to a network monitoring camera, a digital camera, a camcorder, which is a video camera, a TV phone, an interphone, a camera mounted on a drone or a radio-controlled vehicle, etc. Since it is expected that the resolution of the network camera, in particular, will be further increased in the future, it is strongly required to eliminate the amount of data to be communicated.

Further, the embodiments can be applied to a video recording and reproducing apparatus such as a video recorder and a drive recorder that record TV programs and the like. Since the size of the video data is reduced, it is possible to suppress the capacity when data is stored in the storage and to relax the limitation of the speed of reading and writing. Further, the embodiments can be applied to a technique for controlling the bit rate of video data. By changing the image reduction rate and the type of the image processing depending on the network load, the process speed of the system and the like, it becomes possible to control the quality of the image and the amount of data. Further, by changing (selecting) the reduction rate and the type of image processing depending on the subject to be taken and the time zone (the importance of the video), it becomes possible to control the bit rate of the data.

While some or all of the aforementioned embodiments may be described as shown in the following Supplementary Notes, they are not limited to them.

(Supplementary Note 1)

An image receiving apparatus comprising:

a receiving unit that receives a reduced image obtained by reducing the size of an input image and an enlargement parameter where a difference from the input image becomes minimum when the size of the reduced image is enlarged to the size of the input image; and an image restoring unit that enlarges the reduced image using the enlargement parameter to generate a restored image.

(Supplementary Note 2)

The image receiving apparatus according to Supplementary Note 1, wherein the image receiving apparatus enlarges the reduced image by performing super-resolution processing on the reduced image, and the enlargement parameter is a parameter of super-resolution processing selected to make a difference between the result of the super-resolution processing and the input image smaller on a side that transmits the reduced image.

(Supplementary Note 3)

The image receiving apparatus according to Supplementary Note 1, further comprising a status information transmitting unit that transmits status information regarding processing of the reduced image to the side that transmits the reduced image in order to control reducing processing on the side that transmits the reduced image.

(Supplementary Note 4)

The image receiving apparatus according to Supplementary Note 1, wherein the receiving unit receives, as the enlargement parameter, image enlarging processing that has been selected from a plurality of image enlarging processings that are different from one another to enlarge the reduced image to the size of the input image as the one that makes a difference between results of the enlargement processings and the input image the smallest, and the image restoring unit enlarges the reduced image by the image enlarging processing selected to be the enlargement parameter to generate the restored image.

(Supplementary Note 5)

The image receiving apparatus according to Supplementary Note 1, further comprising a storage unit that stores the reduced image and the enlargement parameter, wherein the receiving unit stores the reduced image that has been received in the storage unit, gives a predetermined access right to the enlargement parameter that has been received, and stores the enlargement parameter to which the predetermined access right has been given in the storage unit.

While the present invention has been described as a hardware configuration in the aforementioned embodiments, the present invention is not limited to it. The present invention can achieve arbitrary processing by causing a processor such as a central processing unit (CPU) to execute a computer program.

In the aforementioned examples, the program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g. magneto-optical disks), CD-ROM (Read Only Memory), CD-R, CD-R/W, DVD (Digital Versatile Disc), BD (Blu-ray (registered trademark) Disc), and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

While the invention made by the present inventors has been specifically described based on the embodiments, it is needless to say that the present invention is not limited to the embodiments already stated above and various changes can be made without departing from the spirit of the present invention.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

The first, second, third, fourth and fifth embodiments can be combined as desirable by one of ordinary skill in the art.

What is claimed is:

1. An image processing system, comprising:
an image transmitting apparatus; and
an image receiving apparatus,
wherein the image transmitting apparatus comprising:
   an image reducing unit that reduces the size of an input image to generate a reduced image;
   an image enlarging processing unit that enlarges the reduced image to an enlarged image;
   a determining unit that determines an enlargement parameter such that:
      when a difference between the size of the input image and a size of the enlarged image is within a predetermined range, the enlargement parameter is generated; and
      when the difference is outside the predetermined range, the image enlarging processing unit adjusts the enlarged image, and based on the adjusted enlarged image, the enlargement parameter is generated; and
   a transmitting unit that transmits the reduced image and the enlargement parameter, and
the image receiving apparatus comprising:
   a receiving unit that receives the reduced image and the enlargement parameter from the image transmitting apparatus; and
   an image restoring unit that enlarges the reduced image using the enlargement parameter to generate a restored image.

2. The image processing system according to claim 1, wherein the image transmitting apparatus and the image receiving apparatus enlarge the reduced image by performing a super-resolution processing on the reduced image, and
wherein the determining unit determines a parameter of the super-resolution processing where a difference between a result of the super-resolution processing and the input image becomes minimum to be the enlargement parameter.

3. The image processing system according to claim 1, wherein the image transmitting apparatus further comprises a status information accepting unit that accepts status information regarding processing of the reduced image from the image receiving apparatus, and
wherein the image reducing unit reduces the input image using a reduction parameter in accordance with the status information to generate the reduced image.

4. The image processing system according to claim 1, wherein the enlarging processing unit performs a plurality of image enlarging processings that are different from one another to enlarge the reduced image to the size of the input image,
wherein the determining unit selects an image enlarging processing where a difference between results of enlargement by the plurality of respective image enlarging processings and the input image becomes smallest and determines the selected one to be the enlargement parameter, and
wherein the image restoring unit enlarges the reduced image by the image enlarging processing determined to be the enlargement parameter to generate the restored image.

5. The image processing system according to claim 3, wherein the image enlarging processing unit performs a plurality of image enlarging processings that are different from one another to enlarge the reduced image to the size of the input image,
wherein the determining unit selects an image enlarging processing where a difference between results of enlargement by the plurality of respective image enlarging processings and the input image becomes smallest and determines the selected one to be the enlargement parameter, and
wherein the image restoring unit enlarges the reduced image by the image enlarging processing determined to be the enlargement parameter to generate the restored image.

6. The image processing system according to claim 1, wherein the image transmitting apparatus further comprises an adjustment unit that adjusts a reduction parameter to reduce the input image in accordance with a result of encoding the reduced image, and
wherein the image reducing unit reduces the input image using the reduction parameter that has been adjusted to generate the reduced image.

7. The image processing system according to claim 1, wherein the image receiving apparatus further comprises a storage unit that stores the reduced image and the enlargement parameter, and
wherein the receiving unit stores the reduced image that has been received in the storage unit, adds a predetermined access right to the enlargement parameter that has been received, and stores the enlargement parameter to which the access right has been given in the storage unit.

8. An image processing method, comprising:
in an image transmitting apparatus:
reducing a size of an input image to generate a reduced image;
enlarging the reduced image to an enlarged image;
determining an enlargement parameter such that:
when a difference between the size of the input image and a size of the enlarged image is within a predetermined range, the enlargement parameter is generated; and
when the difference is outside the predetermined range, the enlarged image is adjusted, and based on the adjusted enlarged image, the enlargement parameter is generated;
and
transmitting the reduced image and the enlargement parameter; and
in an image receiving apparatus:
receiving the reduced image and the enlargement parameter from the image transmitting apparatus; and
enlarging the reduced image using the enlargement parameter to generate a restored image.

9. The image processing method according to claim 8, further comprising:
in the image transmitting apparatus and the image receiving apparatus, enlarging the reduced image by performing a super-resolution processing on the reduced image; and
in the image transmitting apparatus, determining a parameter of the super-resolution processing where a difference between a result of the super-resolution processing and the input image becomes minimum to be the enlargement parameter.

10. The image processing method according to claim 8, further comprising:
in the image transmitting apparatus:
accepting status information regarding processing of the reduced image from the image receiving apparatus; and
reducing the input image using a reduction parameter in accordance with the status information to generate the reduced image.

11. The image processing method according to claim 8, further comprising:
in the image transmitting apparatus:
performing a plurality of image enlarging processings that are different from one another to enlarge the reduced image to the size of the input image; and
selecting an image enlarging processing where a difference between results of enlargement by the plurality of respective image enlarging processings and the input image becomes smallest and determining the selected one to be the enlargement parameter; and
in the image receiving apparatus:
enlarging the reduced image by image enlarging processing determined to be the enlargement parameter to generate the restored image.

12. The image processing method according to claim 10, further comprising:
in the image transmitting apparatus:
performing a plurality of image enlarging processings that are different from one another to enlarge the reduced image to the size of the input image; and
selecting an image enlarging processing where a difference between results of enlargement by the plurality of respective image enlarging processings and the input image becomes smallest and determining the selected one to be the enlargement parameter; and
in the image receiving apparatus:

enlarging the reduced image by the image enlarging processing determined to be the enlargement parameter to generate the restored image.

13. The image processing method according to claim 8, further comprising:
in the image transmitting apparatus:
adjusting a reduction parameter to reduce the input image in accordance with a result of encoding the reduced image; and
reducing the input image using the reduction parameter that has been adjusted to generate the reduced image.

14. The image processing method according to claim 8, further comprising:
in the image receiving apparatus, storing the reduced image that has been received in a storage apparatus, giving a predetermined access right to the enlargement parameter that has been received, and storing the enlargement parameter to which the access right has been given in the storage apparatus.

15. An image transmitting apparatus, comprising:
an image reducing unit that reduces a size of an input image to generate a reduced image;
an image enlarging processing unit that enlarges the reduced image to enlarged image;
a determining unit that determines an enlargement parameter such that:
when a difference between the size of the input image and a size of the enlarged image is within a predetermined range, the enlargement parameter is generated; and
when the difference is outside the predetermined range, the image enlarging processing unit adjusts the enlarged image, and based on the adjusted enlarged image, the enlargement parameter is generated; and
a transmitting unit that transmits the reduced image and the enlargement parameter.

16. The image transmitting apparatus according to claim 15, wherein the image transmitting apparatus performs a super-resolution processing on the reduced image to enlarge the reduced image, and
wherein the determining unit determines a parameter of the super-resolution processing where a difference between a result of the super-resolution processing and the input image becomes minimum to be the enlargement parameter.

17. The image transmitting apparatus according to claim 15, further comprising a status information accepting unit that accepts status information regarding processing of the reduced image from outside,
wherein the image reducing unit reduces the input image using a reduction parameter in accordance with the status information to generate the reduced image.

18. The image transmitting apparatus according to claim 15, wherein the image enlarging processing unit performs a plurality of image enlarging processings that are different from one another to enlarge the reduced image to the size of the input image, and
wherein the determining unit selects an image enlarging processing where a difference between results of enlargement by the plurality of respective image enlarging processings and the input image becomes smallest and determines the selected one to be the enlargement parameter.

19. The image transmitting apparatus according to claim 17, wherein the image enlarging processing unit performs a plurality of image enlarging processings that are different from one another to enlarge the reduced image to the size of the input image, and
wherein the determining unit selects an image enlarging processing where a difference between results of enlargement by the plurality of respective image enlarging processings and the input image becomes smallest and determines the selected one to be the enlargement parameter.

20. The image transmitting apparatus according to claim 15, wherein the image transmitting apparatus further comprises an adjustment unit that adjusts a reduction parameter to reduce the input image in accordance with a result of encoding the reduced image, and
wherein the image reducing unit reduces the input image using the reduction parameter that has been adjusted to generate the reduced image.

* * * * *